Figure 1:
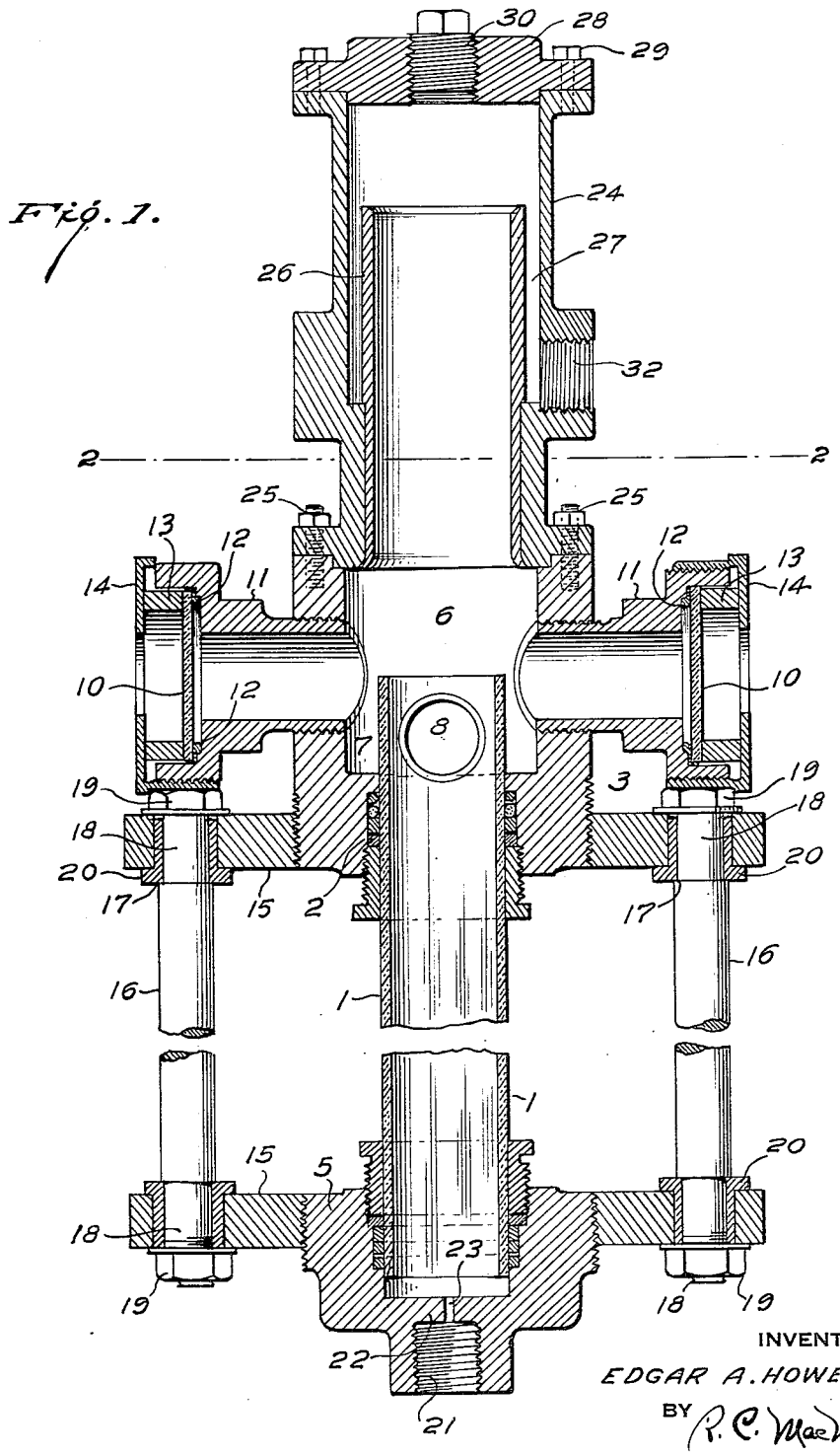

Feb. 8, 1955 E. A. HOWELL 2,701,468
HIGH-PRESSURE, SPECIFIC-GRAVITY, CONSTANT-LEVEL SAMPLING WELL
Filed May 13, 1953 2 Sheets-Sheet 1

INVENTOR·
EDGAR A. HOWELL,
BY P. C. Mackels,
ATTORNEY

United States Patent Office 2,701,468
Patented Feb. 8, 1955

2,701,468

HIGH-PRESSURE, SPECIFIC-GRAVITY, CONSTANT-LEVEL SAMPLING WELL

Edgar A. Howell, East Norwalk, Conn., assignor to American Cyanamid Company, New York, N. Y., a corporation of Maine Application May 13, 1953, Serial No. 354,740

4 Claims. (Cl. 73—33)

This invention relates to apparatus for determining specific gravity and, more particularly, to apparatus for continuously indicating the specific gravity of liquids flowing in a conduit under high pressure.

In many process operations specific gravity is directly related to composition. Thus, it can serve as a reliable guide to the purity, concentration or dilution of solutions used in or produced during the process, such as solutions of acids, bases, salts, syrups, liquid hydrocarbons and the like. For this purpose it is quite generally the practice in designing process apparatus to include small, draw-off valves at the different stages of operation so that samples may be withdrawn periodically, if desired, during the process and transferred to the laboratory for examination and testing. It is particularly advantageous in a continuously-operating process to be able to tell instantly the specific gravity of liquids flowing in different parts of the apparatus. By this means adjustments, if necessary, can be made quickly, the process operated efficiently, and a product of assured constant uniformity obtained.

While draw-off valves appear to provide a ready means of obtaining a sample, their use under some conditions is dangerous and hazardous. This is particularly true when the solution to be tested is corrosive, poisonous or inflammable and under high pressure or at elevated temperature, or both, and serious accidents have resulted from the use of such valves in attempts to secure samples under these conditions. Continuously operating means have been developed for determining the specific gravity of flowing streams of liquids, but these have mostly been made of glass and their use limited to operations involving low or only moderate temperatures and pressures. Even under such conditions their use has proven unsafe. The glass parts that go to make up the apparatus are fused together or fitted with ground-glass joints, and there is an ever-present possibility of breakage due to the setting up of strains in assembling or mounting of the apparatus, or of vibration, temperature or pressure changes to which the apparatus may become subjected in use.

Among the objects of the present invention are the provision of an apparatus for continuously indicating the specific gravity of flowing liquids, which apparatus shall be rugged and strong in construction, simple in operation and inexpensive in manufacture; the provision of such an apparatus that can be used in connection with corrosive, poisonous or inflammable liquids under high or low pressure and at high or low temperatures with safety and freedom from danger of breakage; and the provision of such an apparatus that lends itself well for use with automatic electrical recording apparatus such as may be desirable when a continuous chart showing variations in operation is wanted.

These objects, as well as others, as will later become apparent, are accomplished by the provision of a metal housing at each end of a heavy glass sampling-well tube, the housings being strong and free from breakage due to strains, extreme pressure, or temperature fluctuations and secured to each other and to the glass of the sampling well so as to resist shock and prevent its transmission or the transmission of undesirable strains to the sampling well. In a preferred embodiment of the invention the housings, although separable, are rigidly secured together in fixed, spaced-apart relation with the tube of the sampling well supported therebetween, free of undesirable strains in packing glands provided therefor on each housing. In use the apparatus is, of course, operated in a vertical position with a hydrometer float in the sampling well. Heavy glass windows are provided in the upper housing for observing the position of the float in the liquid, and the apparatus is connected to the flow line or to a by-pass from such a line by attachment through the top and bottom housings, thus relieving the glass well of any strains occasioned by slight misadjustment of the attaching pipes. To maintain the level of the liquid overflowing the sampling well constant means is provided for maintaining it in hydrostatic balance.

Figure 2:
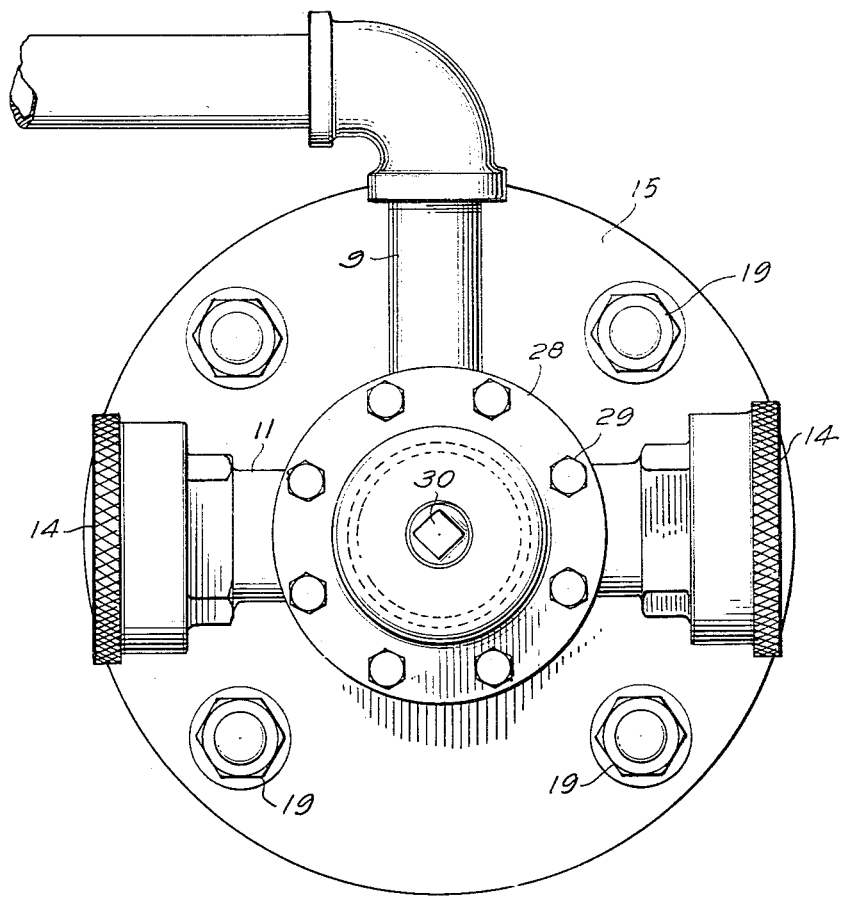

The invention will be further described with reference to the accompanying drawings wherein Figure 1 is a vertical sectional view of an apparatus for determining specific gravity constructed in accordance with the invention and Figure 2 is a top plan view of such apparatus.

Referring to the drawings, the numeral 1 indicates the sampling well tube which is advantageously made of glass or other corrosive-resistant, dielectric material for a reason more fully explained hereinafter. As shown, the upper end of the tube passes through a packing gland 2 into an upper metal housing 3 while the lower end is carried in a similar packing gland 4 in a lower housing or flange support 5. Upper housing 3 is provided with a chamber or enlarged bore 6 into which tube 1 protrudes to provide an annular recess 7 about the end of the tube, between it and the walls of the chamber. Liquid overflowing the top end of tube 1 is prevented from accumulating in recess 7 or from rising in the recess to the level of the top of tube by means of a drain port 8 to which pipe 9 is attached as shown in Figure 2. Arranged in the side wall of upper housing, opposite the end of tube 1, are sight-glass windows 10. The windows are advantageously disposed diametrically opposite each other and each consist of a short nipple 11 in threaded engagement with the wall of the housing. The nipples are enlarged at their outer ends to receive the heavy glass windows which are held in place between sealing gaskets 12 and 13 by means of an eye piece 14 in threaded engagement with the outside of the nipple as shown.

Threaded on each housing 3 and 5 are flanges 15 which are secured together in fixed, spaced-apart relation by means of bolts 16. For this purpose the bolts are reduced in diameter at their ends to provide shoulders 17 and are threaded as at 18 to receive nuts 19. The holes in the flanges through which the bolts pass are provided with flanged bushings 20 which engage with shoulders 17 on the bolts when the nuts are tightened.

The liquid inlet to the sampler is provided at the bottom of the lower housing and consists of an internally threaded opening 21 adapted to receive the threaded end of a pipe or pipe-coupling nipple not shown. In order to provide sufficient back pressure on the liquid passing into the sampling well for hydrostatically balancing the overflow at the upper end of tube 1, a partition 22 having a flow-restricting orifice 23 is provided between the inlet 21 and the lower end of tube 1. The level of the liquid overflow at the top of tube 1 is maintained substantially constant by means of a second overflow arrangement mounted on top of housing 1. This consists of an upstanding tubular casing 24 secured to the top of housing 1 by means of bolts 25. The casing is provided with an inner upstanding tube 26 of reduced diameter fitted closely to the walls of the lower portion of the casing, but spaced from the walls of the upper portion to provide an annular recess 27. As shown, tube 26 terminates below the top of the casing 24 and is of greater internal diameter than sampling well 1. The top of the casing is closed by a cover 28 bolted thereto as at 29. A threaded opening 30, normally closed by a plug, is provided in the cover for ready access to the interior of the sampler. Delivery of liquid to the recess 27 in casing 24 is by means of threaded pipe opening 32 in the side of the casing opposite the recess.

In use, a hydrometer float is positioned in the sampling well and the apparatus arranged in a vertical position to receive liquid from a flow line (not shown) at inlets 21 and 32. Liquid entering at 21 passes through the restrictive orifice 23 and rises in well 1 to the top of the well where it floats the hydrometer and overflows into recess 7. Discharge from the recess is through port 8 and drain pipe 9 to a point of reduced pressure, advantageously the flow line down stream from the point where the liquid was originally withdrawn. Since the float is raised somewhat by the flow of liquid as well as by the gravity of the liquid a substantially constant head or balancing hydrostatic pressure is maintained on the liquid overflowing the sampling well. This is important where pressure variations in the flow of liquid to the apparatus are encountered to assure that any movement of the hydrometer float is indicative of a change in the specific gravity of the liquid rather than a change in liquid level and is accomplished by the counterbalancing hydrostatic head under which liquid is delivered into the upper casing 24 through pipe 32. Liquid entering 24 at 32 rises in recess 27 and overflows into tube 26 where it runs down the walls of the tube into chamber 6 and joins the liquid in recess 7 for discharge back into the flow line as described.

The liquid entering through the flow line is therefore divided into two streams, one flowing into the bottom of the sampling well tube 1 through the orifice 23 and the other rising into the recess 27 by way of inlet 32. The difference in level between the orifice 23 and the upper edge of tube 26 establishes a constant hydrostatic head which results in a constant flow of liquid through the orifice and around the hydrometer in tube 1.

For best results the rate of flow of liquid from the flow line to the apparatus should be adjusted until the quantity overflowing recess 27 at least equals the quantity overflowing well 1 into recess 7. The liquid flow to and from the apparatus and the apparatus itself must be completely closed to assure equalization of pressures at the two overflows. The sight-glass windows 10 in the sides of housing 3 are provided for the purpose of visually observing the level of the hydrometer float in the liquid in well 1 and for noting the specific gravity of the liquid as indicated by the scale on the stem of the float.

The present invention is particularly adapted for use with a hydrometer float inductively coupled to electrical apparatus for automatically and continuously recording variations in float level. In such apparatus the well tube must be formed of a non-corrosive, non-magnetic or dielectric material, namely glass or the like, for the reason that the tube is surrounded by induction coils whose electrical characteristics are magnetically affected by the position of the float with respect thereto. In the construction of apparatus of the present invention the glass tube forming the hydrometer well fairly floats in the packing gland between the upper and lower housings and is protected against breakage due to strains or shocks which may be imposed on the other parts of the apparatus when in use. In addition, the glass tube of the sampler is readily accessible for inspection, cleaning, adjustment or replacement.

I claim:

1. Apparatus for continuously indicating the specific gravity of liquids flowing under high pressure comprising a tubular glass sampling well adapted to contain a hydrometer float, an upper metal housing for the top end of said tube, said tube projecting upwardly into said housing for overflow discharge of liquid into the housing, a drain in the bottom of the housing for removing liquid from the housing, openings in the housing opposite the end of the tube, sight glasses sealed in said openings for viewing the end of the tube to observe the hydrometer floating at the level of the overflow of liquid from said tube, a lower metal housing for the lower end of the tube, means for rigidly securing said lower housing to said upper housing in fixed spaced-apart relation, packing glands for sealing the ends of the tube in said housings and conduit connecting means on the lower housing for delivery of liquid to said sampling well.

2. A metallic, high-pressure, specific-gravity, sampling device provided with a glass sampling-well tube and sight glasses for observing the level of liquid overflowing the end of the tube, said device comprising a body portion having side walls and a bottom defining a chamber, a glass sampling-well tube having an open end protruding into the chamber through the bottom thereof, sight glasses in the side walls of the chamber opposite the end of the tube, a drain port in the bottom of the chamber, a support for the opposite end of the tube, means for rigidly securing said support to the body portion in fixed spaced-apart relation to the body portion packing glands forming seals between said tube and said body portion and said tube and support, means on the support in communication with said tube for connection with a source of supply of liquid for passage to the tube, a closure for the top of said chamber and means in communication with the top of the chamber above the end of said sampling-well tube for hydrostatically balancing variations in pressure of the liquid in said tube so as to maintain the level of the liquid overflow at the top of the tube substantially constant.

3. A high-pressure, constant-level, specific-gravity sampling well comprising a metal body portion provided with a bore, a metal flange provided with a bore, connecting means on the flange for receiving liquid to be discharged into the bore in the flange, a restriction in the flange between the connection and the bore in the flange, means for securing the flange to the body portion in fixed, spaced-apart relation with said bores in axial alignment, a removable sampling-well tube connecting said bores for liquid communication therebetween, packing means for sealing the tube in said bores, the end of the tube in the bore of the body portion being of less diameter than the bore of the body portion to provide an annular recess between the tube and the walls of the bore, a discharge port in the body portion in communication with the recess below the end of the sampling tube for discharging liquid overflowing the tube, diametrically opposed openings in said body portion opposite the end of the sampling tube, sight glasses sealed in said openings for visually observing the level of the liquid overflowing the end of said tube, and means connected to the body portion in communication with the bore above the end of said tube for hydrostatically balancing variations in pressure of the liquid in said sampling-well tube so as to maintain the level of the liquid overflow at the top of said tube substantially constant.

4. An all-metal, high-pressure specific-gravity sampling device provided with a glass, sampling-well tube and sight glasses for observing the level of liquid overflowing the end of the tube, said device comprising a body portion having side walls and a bottom defining a chamber, a glass, sampling-well tube having an open end for protruding into the chamber through the bottom thereof, sight glasses in the side walls of the chamber opposite the end of the tube, a drain port in the bottom of the chamber, a support for the opposite end of the tube, means for rigidly securing said support to the body portion in fixed, spaced-apart relation to the body portion packing glands forming seals between said tube and said body portion and said tube and support, means on the support in communication with said tube for connecting with a source of supply of liquid for passage to the tube, means comprising a second overflow arrangement mounted on and closing the top of said chamber, said means including an outer tube having a closed top and an inner tube, the lower ends of said inner and outer tubes being in sealed engagement one with the other, the upper end of said inner tube terminating short of the top of the outer tube and having its upper side walls spaced from the inner walls of the outer tube to provide an annular recess, and liquid inlet means in the outer tube for delivery of liquid to said recess to overflow into the inner tube and chamber for hydrostatically balancing variations in pressure of the liquid in said sampling-well tube so as to maintain the level of the liquid overflow at the top of the well tube substantially constant.

References Cited in the file of this patent

UNITED STATES PATENTS

| 63,334 | Tice | Mar. 26, 1867 |
| 2,023,196 | Fairchild | Dec. 3, 1935 |

OTHER REFERENCES

Ess Instrument Co. Bulletin SG-2, Bergenfield, N. J., September 16, 1948.